United States Patent [19]

Wörndli

[11] Patent Number: 4,932,681
[45] Date of Patent: Jun. 12, 1990

[54] RECORDING MEDIUM

[76] Inventor: Gerhard A. Wörndli, Lerchenbühlstrasse 14, 6045 Meggen, Switzerland

[21] Appl. No.: 313,397

[22] Filed: Feb. 21, 1989

[30] Foreign Application Priority Data

Feb. 22, 1988 [CH] Switzerland ............................ 663880

[51] Int. Cl.$^5$ ................................................ B41L 1/00
[52] U.S. Cl. ...................... 282/9 R; 428/40; 428/916; 282/8 R; 282/8 A; 282/9 A; 282/28 R; 282/27 A; 282/28 A; 283/72
[58] Field of Search .............. 282/9 R, 9 A, 8 R, 8 A, 282/27 R, 27 A, 28 A; 40/615; 156/247, 249, 277, 289; 428/40, 58, 41, 57, 68, 914, 916; 283/72, 81

[56] References Cited

U.S. PATENT DOCUMENTS

| 1,117,913 | 11/1914 | Rothschild | 282/8 |
| 4,248,919 | 2/1981 | Davis | 428/40 |
| 4,621,837 | 11/1986 | Mack | 283/81 |
| 4,772,049 | 9/1988 | Engle | 282/9 R |

FOREIGN PATENT DOCUMENTS

| 1797418 | 8/1971 | Fed. Rep. of Germany . |
| 2531331 | 1/1977 | Fed. Rep. of Germany . |
| 2383023 | 11/1978 | France ...................... 282/27 A |

Primary Examiner—Douglas D. Watts
Assistant Examiner—Thomas Hamill, Jr.
Attorney, Agent, or Firm—James E. Nilles; Donald C. McGaughey

[57] ABSTRACT

A recording medium having two outer sheets (1, 3) forming a pocket, and an extractable intermediate sheet (5) lying in between, the latter producing a recording contrast in a recording action and being removed from the pocket after noting, there further being provided between the outer sheets a sticky area (17), which does not stick to the intermediate sheet but to the opposite sides of the outer sheets (1 and 3), in order to prevent an impairment of the noting by the sticky area (17) provided, the sticky area (17) is provided on one side with respect to the intermediate sheet (5) and the operative connection effecting the recording contrast is arranged on the other side of the intermediate sheet (5) between the latter and the outer sheet (1) neighboring there.

28 Claims, 4 Drawing Sheets

RECORDING MEDIUM

BACKGROUND OF THE INVENTION

The present invention relates to a recording medium having at least a first and a second sheet joined to each other with an intermediate sheet arrangement lying in between. At least one of the first or second sheets has an operative connection with the intermediate sheet arrangement for effecting a recording contrast. There is also provided at least one sticky area between the joined first and second sheets which effects a connection between the opposite sides of the joined sheets which can only be detached with difficulty without destroying them, but does not appreciably effect such a connection with the intermediate sheet arrangement.

A recording medium of the said type has become known from the international application PCT/CH85/00177, corresponding to the publication WO87/03990. The sticky area is provided on at least one of the two opposite sides of the joined sheets in such a way that, after removing the intermediate sheet arrangement, the sticky area produces a nonreleasable connection of these two sheets which means they cannot be separated without damaging them, making a reinsertion of the removed intermediate sheet arrangement, which is necessary for producing the recording contrast, impossible. This ensures that a recording made on the intermediate sheet arrangement before its removal cannot be supplemented, corrected, etc., after the intermediate sheet arrangement has been removed. In this known recording medium the recording contrast is created by a recording pressure, generated, for example, by means of a ballpoint pen on one of the sheets which passes therethrough and is applied to the intermediate sheet arrangement to cause the recording contrast to transfer from the intermediate sheet onto the other of the sheets.

This type of prior recording medium has the following disadvantage: the areas of the recording medium which are provided with the sticky area mentioned can hardly be used for recording, since the sticky area substantially prevents a satisfactory acceptance of the recording contrast, i.e., damps the recording pressure. Consequently, clearly defined sticky areas and clearly defined recording areas, separate from the latter, have to be provided on the recording medium. This then entails the further disadvantage that the sticky areas mentioned must be precisely laid out for production, i.e., the sticky areas mentioned must be locally delimited and applied in a specific manner to at least one of the joined sheets on the recording medium.

SUMMARY OF THE INVENTION

The present invention has the object of eliminating these disadvantages.

For this purpose there is provided a recording medium arrangement comprising two cover sheets each having an inner side, an outer side and edges disposed one on the other and joined to each other along at least major portions of said edges to form an enclosed pocket having an inside, an outside, and a removal path. An intermediate sheet arrangement is disposed inside of the enclosed pocket and has an area for providing a recording contrast onto at least one of said two cover sheets that is visible from the outside of the enclosed pocket upon a drawing or writing action on said outer side of one of said cover sheets. A removal slit is provided in the enclosed pocket, so that the intermediate sheet arrangement is extractable from said pocket along said removal path through said removal slit. An adhesive means is provided on the inside of said pocket in an area along said removal path of said intermediate sheet arrangement, said adhesive means adherable to said inner sides of said two cover sheets and releasably adhering to said intermediate sheet arrangement so that at least a part of said pocket is automatically sealed by adhesion of said cover when said intermediate sheet arrangement is withdrawn along said removal path through said removal slit, and wherein said adhesive means are provided on said inner side of one of said two cover sheets and said area providing a visible contrast is provided on the other one of said two cover sheets.

Due to the fact that an adhesive area is provided on the one side of one of the jointed cover sheets and the area providing the visible recording contrast is provided between the intermediate sheet arrangement and the other of the joined cover sheets, the production of the visible recording contrast can no longer be impaired by the adhesive area. Consequently, in production the adhesive area can be produced without regard to recordings to be subsequently recorded.

The invention permits applying the adhesive means independently of provision of the recording areas. In a preferred embodiment the adhesive area extends substantially continuously along the one side of one of the joined cover sheets, preferably in the form of strips, which can be produced extremely inexpensively in a production process by a continuous coating or by coating adhesive over an entire area.

It is further proposed that the one of the joined sheets has, on one or both sides, borders which contain sticky areas which are preferably formed by the adhesive area extending continuously along the entire sheet side, and wherein the other of the joined sheets is joined by means of these adhesive coated border areas to the one sheet at the borders on at least two edges. Thus the provided adhesive area is also specifically used for the joining of the two or, if appropriate, of the three joined sheets except for one or two central pockets for receiving the intermediate sheet arrangement or arrangements. One of the sheets may be coated with adhesive either completely or in the form of strips, and the other, to be joined to it, is permanently adhesively bonded to the coated sheet in the border zones after insertion of the intermediate sheet arrangement.

BRIEF DESCRIPTION OF THE DRAWINGS

The invention is explained below by way of example with reference to figures.

DESCRIPTION OF THE PREFERRED EMBODIMENT

Figure 1:
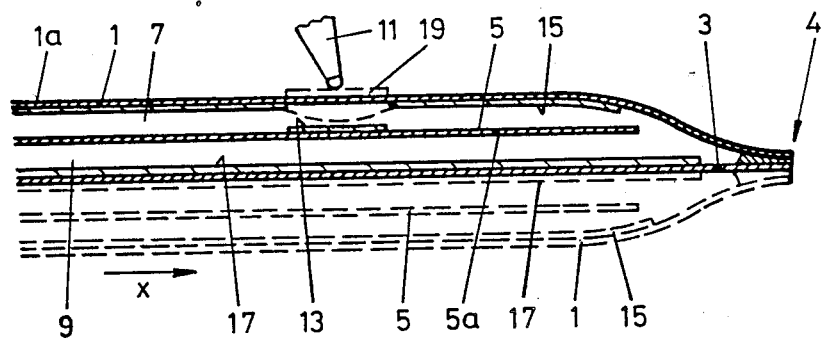
FIG. 1 diagrammatically shows a longitudinal section through a recording medium according to the invention.

According to FIG. 1 a recording medium according to the invention comprises two sheets, a top sheet 1 and a bottom sheet 3 each having inner and outer sides and four borders or edges.

Figure 2:
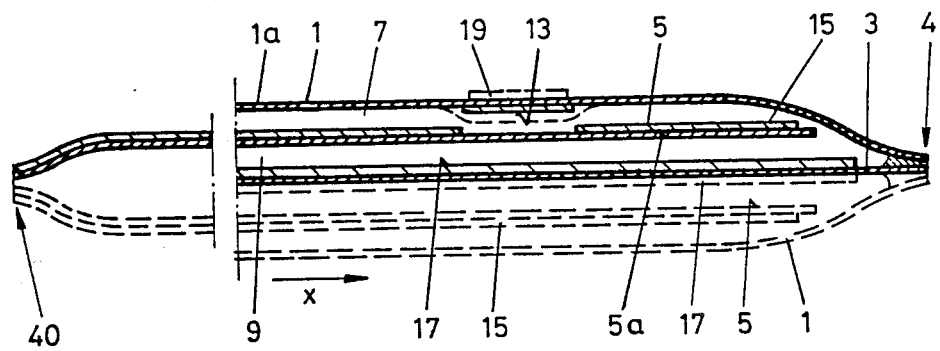
FIG. 2 shows, in a presentation analogous to FIG. 1, a further design variant of the recording medium according to the invention.

These two sheets are, as shown at 4, joined, such as adhesively bonded to each other at the borders, to form a pocket. Between the two sheets 1 and 3 lies an intermediate sheet arrangement 5. The intermediate sheet arrangement 5 separates the pocket formed by the two sheets 1 and 3 into two regions 7 and 9. As shown in FIGS. 1 and 2, in the one region 7 the intermediate sheet arrangement 5 is in an operative facing connection with the sheet 1 in such a way that when a recording act is carried out, such as represented by a ballpoint pen 11, according to FIG. 1 a recording contrast 13 is applied onto the intermediate sheet arrangement 5 or, as shown in the case of FIG. 2, a recording contrast 13 is applied onto the inner side of the sheet 1 facing the intermediate sheet arrangement 5. The applying of the recording contrast 13 to the intermediate sheet arrangement 5, according to FIG. 1, takes place, for example, because the side of the top sheet 1 facing this arrangement 5 is carbonized, as shown diagrammatically at 15, in such a way that, due to the recording pressure, as effected by the ballpoint pen 11, the recording contrast is pressed in the form of the carbonization 13 onto the intermediate sheet arrangement 5.

As shown in FIG. 2, if the recording contrast is to be accepted, onto the sheet 1 for example, the side of the intermediate sheet arrangement 5 facing this sheet 1 is carbonized.

As has been explained, the operative connection which effects the recording contrast 13 is provided in the region 7. The second region 9 is clearly separated from the first region 7, by the intermediate sheet arrangement 5 and has a sticky area 17, preferably formed as shown by an adhesive area which is continuous or in the form of strips along the sheet 3. The adhesive area 17 is stickable to the side of the sheet 3 facing the intermediate sheet arrangement 5 but not to the intermediate sheet arrangement 5. To prevent adhesion the corresponding side 5a of the intermediate sheet is finished with a material which will not stick to the adhesive of which the layer 17 is formed, such as a suitable silicone composition. According to the embodiment of FIG. 1, when the intermediate sheet arrangement 5 is removed after making a recording, the recording contrast 13 remains on the intermediate sheet arrangement and can subsequently be perceived, such as read. Simultaneously, with the removal of the intermediate sheet arrangement, the separation between the intermediate chambers 7 and 9 disappears thus permitting the adhesive layer 17 to come into contact with the top sheet 1, whereby the two sheets 1 and 3 are adhesively bonded to become virtually undetachable without destroying them. In the case of the design variant according to FIG. 1, as mentioned, after extraction of the intermediate sheet arrangement 5 the recording contrast can be read or detected on the extracted intermediate sheet arrangement 5. In the case of the design variant according to FIG. 2, the recording contrast remains on the sheets 1, 3 likewise adhesively bonded virtually undetachably without destroying them after extracting the intermediate sheet arrangement 5, i.e., actually, and as indicated there at 13, on the sheet 1.

The adhesive bonding of the two sheets 1 and 3 in any case will have the effect that, after extraction of the intermediate sheet arrangement 5, a subsequent recording can be readily recognized as such. In the case of both variants, the previously mentioned operative connection in the intermediate chamber 7 is no longer possible after extracting the intermediate sheet arrangement 5. Consequently, as mentioned, in the case of the exemplary embodiment according to FIG. 1, the accepted recording contrast 13 remains on the extracted intermediate sheet arrangement and is readily detachable therefrom since a recording contrast effected, for example, by carbonization on the intermediate sheet arrangement 5 can certainly be distinguished from a recording subsequently made with a conventional writing utensil.

However, an inadmissible subsequent alteration of the contrast recorded on the intermediate sheet arrangement 5 is still possible if the user person has available, for example, a carbon paper of the type which effects the same recording contrast as the carbonization 15 on sheet 1. On the other hand, this design variant makes possible an immediate clear detection of the recording contrast on the extracted intermediate sheet arrangement 5 since it is locally separated, by this very extraction, from a recording contrast 19 subsequently applied externally to the sheet 1, such as with the ballpoint pen 11.

In the case of the design variant according to FIG. 2, the recording contrast 13 remains on the sheet 1 which is adhesively bonded undetachably to the sheet 3 after extracting the intermediate sheet arrangement 5. Consequently a subsequent alteration of the recording contrast 13 is no longer possible, as the operative connection mentioned for production of the recording contrast is eliminated after extracting the intermediate sheet arrangement 5. However, in this case it is somewhat more difficult to separate the external recording contrast 19 applied to sheet 1 by the ballpoint pen 11 according to FIG. 1 from the recording contrast 13 applied from inside. This problem is preferably remedied by the fact that a color or shade thereof which differs from the recording color of usual writing utensils, for example, red or green, is chosen as recording contrast 13, and consequently for the carbonization 15 of the intermediate sheet arrangement 5. Thus it is then possible, in any case, to distinguish where a recording contrast 13 has been effected from inside and where, virtually unauthorizedly, simply the external recording contrast 19 has been applied after removing the intermediate sheet arrangement. A further measure which can be taken additionally or by itself to solve this problem of detection is to form the upper outer side 1a of the sheet 1 in such a way that it cannot be written on at all with conventional writing utensils, i.e., does not accept any contrast 19, thus, for example, to coat it with plastic or siliconize it. However, in so doing it must always be ensured, in the case of the design variant of FIG. 2, that the sheet 1 remains transparent to such an extent that the contrast 13 is readily clearly visible from outside after adhesive bonding of the sheets 1 and 3.

As shown in both FIGS. 1 and 2, the application of the adhesive area 17 is completely independent of where a recording is to be made on the recording medium. Preferably the bottom sheet 3 is provided with the adhesive area 17 extending continuously in its longitudinal extent x or in the form of transverse strips. As also shown by broken lines in both figures, an optimal utilization of material and space is achieved by the recording medium being designed as a double recording medium. For this purpose an outer sheet 1 is stuck on both sides of the sheet 3 which then acts as a middle sheet, and an intermediate sheet arrangement 5 is provided on each of both sides of the middle sheet 3. The middle sheet 3 is then coated with the adhesive layer 17 to form both adhesive areas 17, preferably continuously on both sides in the longitudinal direction or in the form of transverse strips.

Figure 3:
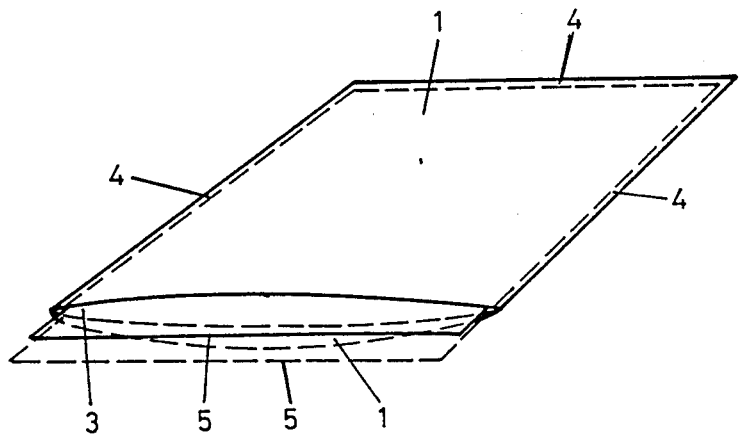
FIG. 3 shows a diagrammatic, perspective view of a recording medium according to the invention.

In FIG. 3 the recording medium according to the invention is shown in perspective with the two or three sheets 1 and 3 being adhesively bonded along three border areas 4 and one or two intermediate sheet arrangements 5 being arranged in between.

Figure 4A:
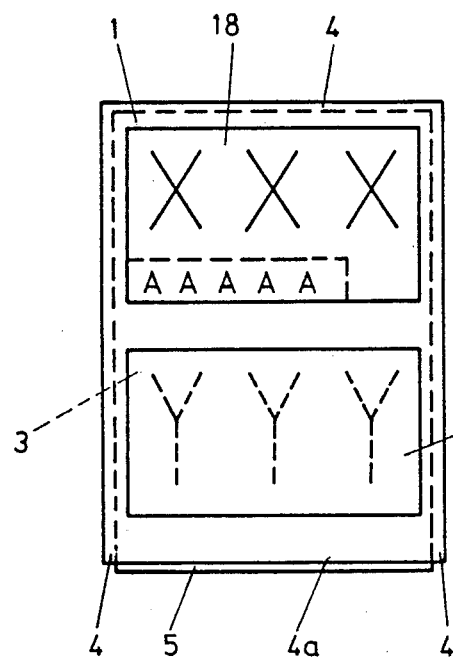
FIGS. 4a to 4c show a recording medium according to the invention in plan view, with successively removed intermediate sheet arrangement.
Figure 4B:
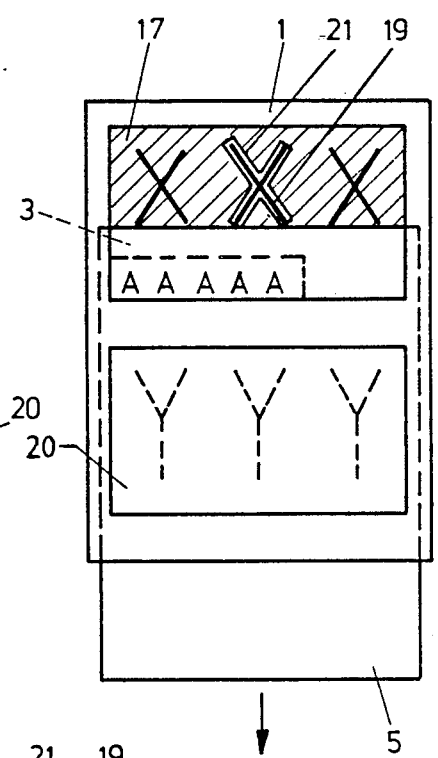
Figure 4C:
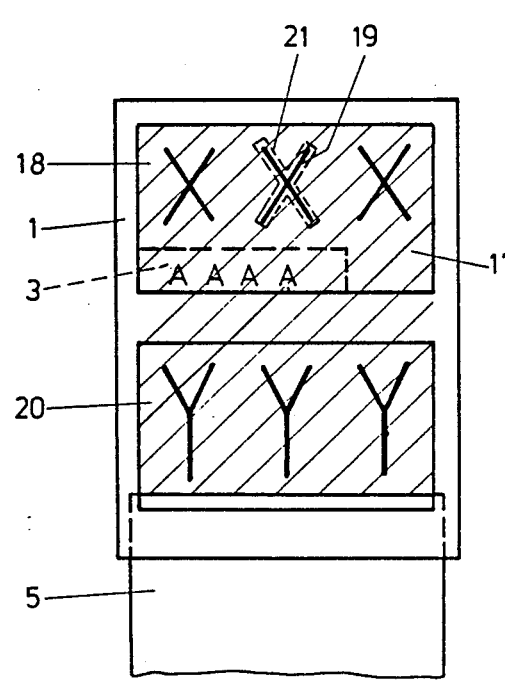

In FIGS. 4A, 4B and 4C a recording medium according to the invention is shown in plan view made up as shown in cross-section in FIG. 2 and with either a single or double recording medium. The recording medium shown here is assumed to be designed as a solution sheet for set problems, such as for teaching. According to FIG. 4a, the intermediate sheet arrangement 5 lies between the joined sheets 1 and 3. The latter are adhesively bonded to each other along the border portions 4. The adhesive layer 17, running continuously in longitudinal and/or transverse direction according to FIG. 2, is preferably also utilized at the borders for the adhesive bonding of the sheets 1, 3. A writing area 18, showing as recording field x, on which the user is to write or draw is marked, for example, on the sheet 1. Accordingly, a problem is printed so as to be perceptible at all times from outside, for example, on the sheet 1 as shown at a perceived information field A. The user then notes the solution in the writing area 18 provided for this purpose which is indicated by XXX. As shown in FIGS. 4b and 4c, he subsequently pulls the intermediate sheet arrangement 5 out from between the sheets 1 and 3 not joined in the border area 4a and then, as indicated again by 17 in these representations, with increasing degree of extraction of the intermediate sheet arrangement 5, the adhesive layer 17 on sheet 3 comes into contact with the sheet 1 and adhesively bonds the areas of these sheets between which the intermediate sheet arrangement 5 has already been extracted. Consequently, the intermediate sheet arrangement 5 can no longer in any way be pushed back between the sheets 1 and 3. Consequently, however, the recording XXX can also no longer be altered once the intermediate sheet arrangement 5 has been removed, as shown in FIG. 4b. As shown at 21, if a different colored recording contrast 13, applied from inside, according to FIG. 2, is chosen, this recording contrast color is clearly recognizable with respect to the contrast 19 applied from outside.

There is then printed on one of the sheets 1 or 3, preferably on sheet 3, prior information in an advance information area y, such as the solution YYY of the set problem corresponding to AAA. When the user has then extracted the intermediate sheet arrangement 5 between the sheets 1 and 3 an appropriate distance, according to FIG. 4c, he sees the solution YYY of the problem solved, can compare his own solution XXX with it but can no longer correct it. In this case, areas 20 with the advance information, such as the problem solutions YYY, are appropriately arranged such that the writing areas 18 assigned to these solutions are adhesively bonded before the user can perceive the solutions YYY.

Figure 5:
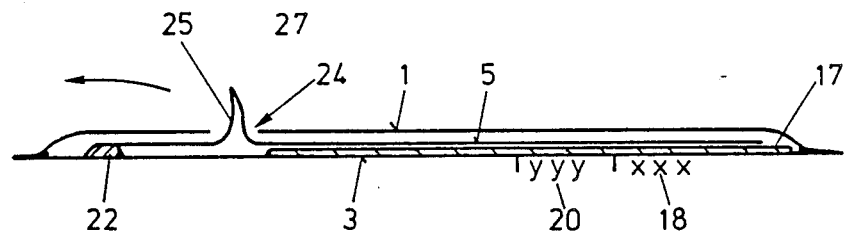
FIG. 5 diagrammatically shows a further embodiment of a recording medium according to the invention.
Figure 7:
FIG. 7 shows a diagrammatic representation of a further variant of the recording medium according to the invention.

If the recording medium according to the invention is realized without further precautions according to FIGS. 1 or 2, there is still no absolute safeguard that the user cannot see the prior information in the fields 20 according to FIG. 4 by lifting sheet 1 slightly relative to sheet 3 as shown in FIG. 3 and looking in before he makes his recording in field 18. In FIGS. 5 and 7 there are then shown design variants which are based on the exemplary embodiments according to FIGS. 1 and 4 and are preferred, such as for the use mentioned, as problem solution sheets which make it impossible to see the prior information for as long as the intermediate sheet arrangement has still not released an assigned section to be written on and the latter is not yet adhesively bonded.

According to FIG. 5, the two sheets 1 and 3 are joined at their four edges. The intermediate sheet arrangement 5 is laid between the sheets 1 and 3 and, as shown at 22, joined, such as adhesively bonded, in the area of only one sheet edge to at least one of the sheets, here to sheet 3. One of the two sheets, sheet 1, has an extraction slit 24 from which a transversely extended portion 25 of the intermediate sheet arrangement 5 protrudes. A field 18 to be written on and a field 20 with information Y provided on the inside of sheet 3 in advance, such as a specimen solution, are arranged relative to one another such that the field 18 for the recording X is arranged closer to the border area which is opposite the connection 22 than the prior information Y assigned to it in field 20. With the arrangement shown, a viewing of the information Y in the field 20 is impossible as long as the intermediate sheet arrangement 5 cover this area, consequently also area 18. Once the recording X has been completed in field 18, the intermediate sheet arrangement 5 is extracted in arrow direction by gripping the tab 25, it first releases the field 18, whereupon the sticking area 17 already adhesively bonds the two sheets 1 and 3 and joins them undetachably there. To assist extraction at the tab 25, as shown at 27, there may be provided a reinforcing element, such as a thin wire, not shown, attached to extend transversely to the intermediate sheet arrangement 5. If the operative connection for producing the recording contrast is formed, as shown in FIG. 1, preferably the carbonization 15 according to FIG. 1 is only applied in the area provided for the recording XXX.

Figure 6:
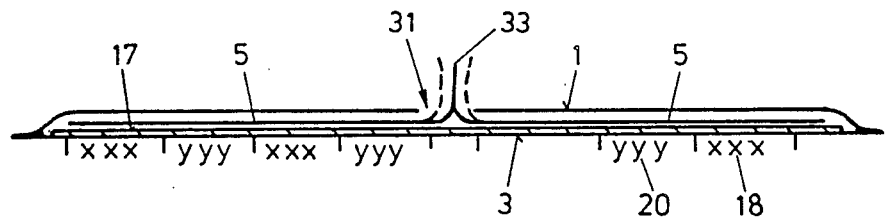
FIG. 6 diagrammatically shows a further design variant of a recording medium according to the invention.

In FIG. 6, a further design variant of the recording medium according to the invention is shown, again made up in principle as shown in FIGS. 1 or 2, with which viewing of information Y provided in advance cannot be prematurely seen. Unlike the design variant according to FIG. 5, the sheet 1 has an extraction slit 31 in its middle area and the intermediate sheet arrangement 5, with the protruding extraction tab 33, extends from this slit 31 on both sides between the sheets 1 and 3. The intermediate sheet arrangement 5 is preferably not joined anywhere to one of the sheets 1 or 3. The arrangement of a recording field 18 with respect to a field 20 with prior information is the same as already explained with reference to FIG. 5. Here too, seeing the information in field 20 before an alteration to the recording in field 18 is not possible because of the action of the adhesive layer 17. On the left side of this figure it is shown by way of example how a sequence of recording fields and fields with assigned prior information are laid out.

In FIG. 7, a third preferred variant is shown in which information Y provided in advance in a field 20 can be prevented from being seen before recording information X in a field 18. Here the sheets 1 and 3 are again joined along three edges. Along the fourth border edge remaining open the intermediate sheet arrangement 5 is joined, such as adhesively bonded, to one of the sheets 3 as shown at 35. The intermediate sheet arrangement 35 has a lower sheet 5a extending between sheets 1 and 3 up to the opposite border area. As has been explained with reference to FIGS. 1 and 2, the lower sheet 5a is treated, for example, siliconized so that it does not stick to the adhesive layer 17. In the border area facing away from the adhesion 35, sheet 5a folds back over itself into an upper sheet 5b, which again runs back to the open border area of the two sheets 1 and 3. This upper sheet 5b is in this case preferably a carbon paper. This upper sheet 5b then forms an extraction element, with the aid of which the entire intermediate sheet arrangement 5a, 5b can be pulled out from between the sheets 1 and 3, with simultaneous exposure and activation of the adhesive layer 17. In this case the lower sheet 5a is preferably made stronger than the other sheets, but nevertheless flexible enough so that it can of course be extracted, and forms a writing underlay for writing actions on sheet 1. It is quite possible in this case also to carbonize the side of an intermediate sheet arrangement facing the sheet 1 with only one sheet according to 5a, and to make the adhesive area 35 able to be torn off, as shown at 37, thereby on the one hand preventing the field 20 being seen inopportunely, and on the other hand making it possible, by tearing off in the area 37, for the then single sheet 5a of the intermediate sheet arrangement 5 to be detached from sheet 3 and extracted. Here too, the operative connection can be realized, as shown in FIG. 1 or in FIG. 2, and in all the variants represented according to FIGS. 5 to 7, the recording medium can be designed as double recording medium, as has already been explained in conjunction with FIGS. 1 and 2.

To prevent the information provided in advance on sheet 3 from being seen inopportunely, it is possible in the case of a double design, as shown by broken lines in FIGS. 1 and 2, for the exterior borders of the intermediate sheet arrangements also to be joined, as shown at 40.

Figure 8:
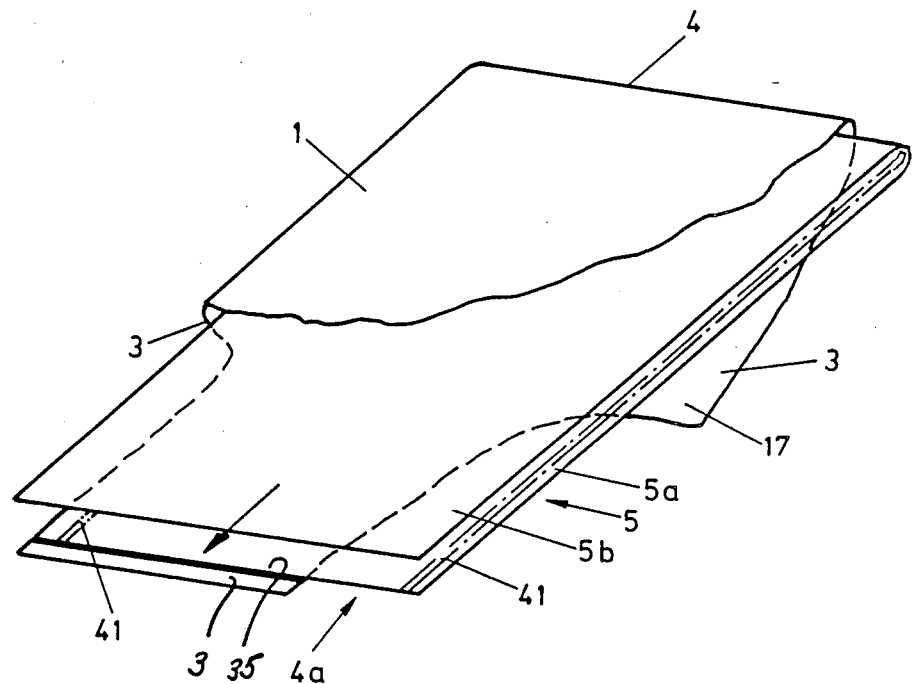
FIG. 8 shows a perspective, partially cutaway representation of the recording medium according to FIG. 7.

In FIG. 8, the design variant according to FIG. 7 is shown once again wherein sheet 5a will be extracted to a precisely desired and uniform extent by pulling on sheet 5b so that it will emerge at least approximately parallel to the border 4 which is opposite the open border 4a. This is achieved according to FIG. 8 by providing slightly adhesive strips 41, along which the sheet 5a slightly adheres to the sheet 3. The adhesion is such that sheet 5a can be readily extracted by pulling on sheet 5b. These adhesive strips 41 ensure the parallel extraction mentioned.

I claim:

1. A recording medium arrangement, comprising:
   two cover sheets each having an inner side, an outer side and edges disposed one on the other and joined to each other along at least major portions of said edges to form an enclosed pocket having an inside, an outside, and a removal path;
   an intermediate sheet arrangement, disposed inside said enclosed pocket;
   an area for providing a recording contrast on at least one of said two cover sheets that is visible from the outside of said enclosed pocket upon a drawing or writing action on said outer side of one of said cover sheets;
   a removal slit in said enclosed pocket, said intermediate sheet arrangement being extractable from said enclosed pocket along said removal path through said removal slit; and
   adhesive means provided at the inside of said pocket in an area along said removal path of said intermediate sheet arrangement, said adhesive means adherable to said inner sides of said two cover sheets, and releasably adhering to said intermediate sheet arrangement, so that at least a part of said pocket is automatically sealed by adhesion when said intermediate sheet arrangement is withdrawn along said removal path through said removal slit;
   said adhesive means acting between said inner side of one of said two cover sheets and said intermediate sheet arrangement; and
   said area for providing said recording contrast acting between said inner side of the other of said two cover sheets and said intermediate sheet arrangement.

2. The arrangement according to claim 1 wherein said area for providing said recording contrast comprises a carbonized area on said inner side of said other of said two cover sheets, providing said recording contrast onto said intermediate sheet arrangement.

3. The arrangement according to claim 1 wherein said area for providing said recording contrast comprises a carbonized area on said intermediate sheet arrangement, said recording contrast being provided onto said inner side of said other of said two cover sheets.

4. The arrangement according to claim 1 wherein in said outer side of said other of said two cover sheets is finished with a surface treatment which at least partialy prevents application of a recording contrast on said outer side of said other of said two cover sheets.

5. The arrangement according to claim 1 further comprising an information area on said pocket on which preprinted information can be provided; said intermediate sheet arrangement including a masking area disposed in said information area for making said preprinted information at least uninterpretable from outside of said pocket.

6. The arrangement according to claim 5 wherein said masking area is joined to said pocket to prevent viewing of said preprinted information by lifting said masking area prior to removing said intermediate sheet arrangement which removal automatically allows adhesive closing of said pocket.

7. The arrangement according to claim 1 wherein at least one recording contrast area is provided on one of said two cover sheets, said adhesive means being so located that removal of said intermediate sheet arrangement from said recording area frees said adhesive means so as to prevent reintroduction of said intermediate sheet arrangement into said recording area.

8. The arrangement according to claim 1, further comprising an information area on said pocket on which preprinted information can be provided, said intermediate sheet arrangement including a masking area disposed in said information area for making said preprinted information at least uninterpretable from the outside of said pocket, said information area being disposed with respect to said adhesive means so as to prevent an amendment of said recording contrast on at least one of said two cover sheets after said masking area of said intermediate sheet arrangement is removed from said information area.

9. The arrangement according to claim 1 wherein said two cover sheets are rectangularly shaped to provide four edges and are joined at three of said edges and wherein said intermediate sheet arrangement is joined at the fourth edge to one of said two cover sheets, said one cover sheet having an information area on which preprinted information can be provided; said intermediate sheet arrangement including a masking area disposed in said information area for making said preprinted information at least uninterpretable from the outside of said pocket, said joint of said intermediate sheet arrangement at said fourth edge of said one of said two cover sheets preventing said preprinted information in said information area from being interrupted before said intermediate sheet arrangement with said masking area is removed from said information area.

10. The arrangement according to claim 9 wherein a recording area is provided on said other of said two cover sheets and wherein said adhesive means are arranged so as to prevent reintroduction of said intermediate sheet arrangement into said recording area once said intermediate sheet arrangement has been withdrawn from said information area.

11. The arrangement according to claim 1 wherein said intermediate sheet arrangement is joined to one of said two cover sheets adjacent to said removal slit.

12. The arrangement according to claim 1 wherein said intermediate sheet arrangement is joined to one of said two cover sheets adjacent to said removal slit and wherein a corner of said intermediate sheet arrangement opposite to said removal slit is joined to a removal element, said removal element being disposed between said corner and said removal slit.

13. The arrangement according to claim 12 wherein said removal element comprises a sheet having said area for providing said recording contrast.

14. The arrangement according to claim 12 further comprising guiding means for guiding said intermediate sheet arrangement during removal by said removal element.

15. The arrangement according to claim 1 further comprising guiding means for guiding said intermediate sheet arrangement during removal.

16. The arrangement according to claim 15 wherein said guiding means comprise slightly sticky adhesive stripes acting between said intermediate sheet arrangement and one of said two cover sheets.

17. The arrangement according to claim 16 wherein said adhesive stripes act between said intermediate sheet arrangement and said one of said cover sheets.

18. The arrangement according to claim 1 wherein said two cover sheets are joined along all of said edges and wherein said removal slit is provided in one of said cover sheets.

19. The arrangement according to claim 18 wherein an information area is provided on said inner side of that one of said two cover sheets which is not provided with said removal slit on which preprinted information can be provided, said information area being masked by said intermediate sheet arrangement before said intermediate sheet arrangement is removed from said information area through said removal slit.

20. The arrangement according to claim 1 wherein one of said two cover sheets has a perceivable information field for containing information, such as a problem, which can be perceived if need be from outside said sheet arrangement at any time; at least one recording field for making a recording, such as the solution to the problem on said other of said two cover sheets; a preprinted information area on one of said cover sheets located so that it can only be perceived from the outside after removing of the intermediate sheet arrangement and freeing said adhesive means, thus preventing further recording on said at least one recording field after said preprinted information area can be perceived, said preprinted information area containing, e.g., a correct solution of that problem.

21. The arrangement according to claim 1 wherein said adhesive means comprises an adhesive area extending substantially continuously along the inner side of said one of said two cover sheets.

22. The arrangement according to claim 21 wherein said adhesive area comprises adhesive strips.

23. The arrangement according to claim 1 wherein said recording contrast is in a color or shade which differs from writing colors which may be used on said other of said two cover sheets, so that said recording contrast, visible from outside of said pocket, will be recognizably different from a writing color that may be applied to said area when making said drawing or writing action.

24. The arrangement according to claim 1 wherein a further sheet is joined to said two cover sheets along at least major portions of its edges so that said two cover sheets and said further sheet form a pair of pockets, said intermediate sheet arrangement comprising two intermediate sheet arrangements, one of said intermediate sheet arrangements lying between one of said two cover sheets and said further sheet, said second intermediate sheet arrangement lying between said further sheet and the other of said two cover sheets, said further sheet having said adhesive means on both of its sides.

25. The arrangement according to claim 24 wherein each of said pockets has a removal slit and said two intermediate sheet arrangements have joint ends extending from said removal slits of said two pockets.

26. The arrangement according to claim 1 wherein said intermediate sheet arrangement comprises a sheet having a side, which faces the inner side of said one cover sheet provided with said adhesive means, that is provided with a coating that will not adhere to said adhesive area.

27. The arrangement according to claim 1 wherein one of said two cover sheets has adhesive border areas extending continuously along the entire edges of said sheet and wherein the other of said two cover sheets is joined by means of said adhesive border areas to said one of said two cover sheets.

28. The arrangement according to claim 27 wherein said adhesive border areas extend continuously and along the entire sheet side and are at least a part of said adhesive means.

* * * * *